United States Patent Office 3,359,069
Patented Dec. 19, 1967

3,359,069
PROCESS FOR PRODUCTION OF SULFUR DIOXIDE CONTAINING GASES FROM WASTE PRODUCTS CONTAINING AMMONIUM SALTS OF SULFUR ACIDS
Herbert Furkert, Junkersdorf, and Hermann Röhl, Marl, Germany, assignors to Chemische Werke Huls Aktiengesellschaft, Recklinghausen, and Chemiebau Dr. A. Zieren G.m.b.H., Cologne, Germany
No Drawing. Filed July 2, 1964, Ser. No. 380,016
Claims priority, application Germany, July 10, 1963, C 30,404; May 22, 1964, C 32,948
14 Claims. (Cl. 23—178)

The present invention relates to the production of sulfur dioxide-containing gases from waste products containing ammonium salts of sulfur acids. More particularly, it relates to production of sulfur dioxide-containing gases by the thermal decomposition of waste sulfur acids or their ammonium salts, in the presence of oxygen.

By-products containing ammonium salts and waste sulfur acids, together with organic impurities, are produced during the production of many organic compounds by sulfonation followed by neutralization with ammonia. It has previously been the custom to neutralize such by-products with ammonia and recover the ammonium sulfate thereby produced. Such processes, however, have not been very satisfactory on account of the serious operating difficulties encountered as a result of the organic impurities present. Because of the presence of the latter it has usually been necessary to subject the ammonium sulfate to repeated recrystallizations or else to remove the impurities by solvent treatment. In such cases, however, it was then necessary to subject the solvents to complicated and expensive treatments in order to recover them in a form suitable for further use.

It has now been discovered that sulfur dioxide-containing gases suitable for the production of sulfuric acid can be readily and economically obtained from by-products containing ammonium salts. This is accomplished in accordance with the present invention by subjecting such by-products containing ammonium salts to thermal decomposition under reducing conditions by injecting the waste by-products containing sulfur acids and ammonium salts into a combustion furnace maintained at temperatures of the order of 800° to 1200° C. while simultaneously introducing oxygen or an oxygen-containing gas such as air. (By the term "reducing conditions" is meant that hexavalent sulfur in sulfuric acid is reduced to tetravalent sulfur in sulfur dioxide.)

The waste by-products containing sulfur acids and ammonium salts, obtained from the sources mentioned above, or otherwise, usually contain from 10 to 50% by weight of inorganic ammonium salts, 10 to 20% by weight of organic ammonium salts, 10 to 40% by weight of sulfuric acid, 0 to 10% by weight of organic impurities, and 20 to 40% by weight of water but these values will vary considerably with the source of the by-products and the particular operating conditions under which they are produced. It is distinctly understood, therefore, that the process of the present invention is not limited to by-products of any particular composition, but instead is operative generally with by-products containing sulfur acids and ammonium salts.

The process of the present invention can be satisfactorily carried out either batchwise or continuously in a combustion furnace provided with an acid-proof lining. The process is advantageously operated in two stages in the first of which the principal reaction takes place and the second stage serving as an after stage for the completion of the reaction.

The waste by-products containing the sulfur acids and ammonium salts are preferably atomized by air or other oxygen-containing gas either directly into the combustion chamber, or prior to introduction, the chamber being maintained at the desired decomposition temperature. It is important that the atomized particles be as small as possible so as to facilitate their rapid decomposition in the reaction chamber.

The holding time of the atomized particles in the reaction chamber is controlled by regulating the decomposition temperature and the rate of introduction of oxygen. The sulfur dioxide-containing gaseous decomposition products resulting from this operation are surprisingly free from nitric oxide and are suitable for sulfuric acid production. The holding time in the reaction chamber is generally of the order of from 0.3 to 15 seconds. The temperature should not be permitted to fall appreciably below 800° C. since below this temperature the ammonium salts will not be completely decomposed. The most satisfactory results are usually obtained when the temperature is maintained between 1000° and 1100° C.

The desired decomposition temperature in the furnace can be maintained by any suitable means, as for example, by the simultaneous combustion of fuel oil, heating gas and hydrogen sulfide or sulfur. It is advantageous to use a mixture of such substances since it is then easy to regulate the sulfur dioxide content of the resulting gaseous decomposition products to the concentration most desirable for sulfuric acid production. This, however, is not a critical feature of the present invention since any suitable heating means can be employed.

With the holding time maintained at from 0.3 to 15 seconds, the concentration of oxygen should be regulated to 3 to 10% by volume of the gases in the reaction chamber.

Holding times of 0.3 and 2.5 seconds and 8 to 10 seconds have been found to be especially advantageous, the oxygen content of the gaseous mixtures being in such cases 3 to 9% and 4 to 10% by volume. When carrying out the process in a two stage operation and using a holding time of 0.3 to 2.5 seconds in the first stage, the holding time in the second stage will be selected so that the oxygen content of the gases leaving the first chamber will be 4.5 to 5.5% by volume and 3 to 9% from the second stage.

The hot gaseous reaction products from the reaction chamber are cooled by any suitable means, as for example by the addition of air, or by atomization of liquids such as water or dilute sulfuric acid, or they may be cooled indirectly by heat exchange with the production of highly superheated steam. The cooled decomposition gases, which are substantially free from nitric oxide, can be oxidized catalytically to sulfur trioxide and then further converted to sulfuric acid or oleum.

The following examples are given to illustrate the present invention. It is to be understood, however, that the invention is not limited to the specific details shown in the examples as various modifications therefrom will be obvious to one skilled in the art. All such variations that do not depart from the concept of the invention are intended to come within the scope of the appended claims.

*Example I*

Into a 24 m.³ capacity combustion furnace provided with an acid-proof refractory lining and heated to 1000° C., 450 liters of waste sulfuric acid were atomized from above with approximately 400 m.³ of air per hour. The atomized waste sulfuric acid contained approximately 36% by weight of ammonium bisulfate, 20% by weight of sulfuric acid, 10% by weight of organic impurities including ammonium salts, and about 34% by weight of water. In order to maintain the decomposition temperature, 200 liters of liquid sulfur and 150 m.³ of heating gas (4200 calories) per hour were likewise introduced into the reaction chamber, together with sufficient air to maintain an oxygen level of 5.5% by volume. After cooling the hot decomposition gases, an hourly production of 2700 m.³ of a gaseous product containing 11.5% by volume of sulfur dioxide and 5.5% by volume of oxygen was obtained.

The sulfur dioxide-containing gases obtained as above described were diluted with sufficient air so that after separation of the water and drying of the gases over sulfuric acid they still contained 7 to 8% by volume of sulfur dioxide. In the sulfuric acid then produced, nitrogen oxides were present in amounts corresponding to about 10 p.p.m. (0.001% by weight) nitrogen.

*Example II*

Into a combustion chamber containing an acid refractory lining and heated to 980° C., 4.2 tons of waste sulfuric acid were atomized per hour. Simultaneously, 9,900 Nm.³ of air, approximately 700 Nm.³ of hydrogen sulfide vapors (containing 60% $H_2S$) and 650 kg. of liquid sulfur were introduced into the combustion chamber. At the same time, various other waste gases and liquids in lesser amounts were introduced and burned therewith. From the furnace there was an hourly output of approximately 15,400 Nm.³ of gases which were then conducted to an after burning chamber where they were cooled by the addition of 3200 Nm.³ of air at 870° C. The holding time in the first chamber was 0.6 second and in the second chamber 0.4 second. From the second chamber a gas was discharged which contained approximately 8% by volume of sulfur dioxide and 3.8% of oxygen, which after the conventional cooling and drying, was delivered to a contact sulfuric acid apparatus which produced approximately 150 tons of monohydrate per day in the form of 98% sulfuric acid, containing nitrogen oxides in amounts of 8.3 p.p.m. of nitrogen.

*Example III*

Into a combustion furnace provided with a refractory lining and heated to 995° C., 3.4 tons of waste sulfuric acid were atomized per hour, together with 8000 Nm.³ of air, approximately 570 Nm.³ of hydrogen sulfide vapors containing approximately 60% $H_2S$, and 526 kg. of liquid sulfur. At the same time, various other waste vapors and liquids were also introduced into the furnace in smaller amounts and burned. Approximately 12,500 Nm.³ of gaseous products were discharged from the combustion furnace per hour. The latter were introduced into an after burning chamber along with approximately 2600 Nm.³ of air, being cooled thereby to 880° C. The holding time in the combustion furnace was 0.7 second and in the after furnace 0.5 second. From the second chamber was obtained a gaseous mixture containing about 8% by volume of sulfur dioxide and 3.8% by volume of oxygen, which after the conventional cooling and drying was conducted to a contact sulfuric acid apparatus which produced about 120 tons per day of monohydrate in the form of 98% sulfuric acid, containing nitrogen oxides in amounts corresponding to 8.0 p.p.m. of nitrogen.

*Example IV*

Into a refractory lined combustion furnace heated to 950° C. was introduced about 2.1 tons of waste sulfuric acid, 6000 Nm.³ of air, about 350 Nm.³ hydrogen sulfide vapors and 330 kg. of liquid sulfur, per hour. The holding time in the furnace was 1.8 seconds. Approximately 9,500 Nm.³ of gaseous mixture were obtained per hour, containing approximately 8% by volume of sulfur dioxide and 4.1% oxygen. The sulfuric acid produced from this gas contained nitrogen oxides in amounts of 9.1 p.p.m. of nitrogen.

What is claimed is:

1. In a process for the production of a sulfur dioxide-containing gas suitable for use in the manufacture of sulfuric acid, the steps of finely atomizing a waste liquor comprising a sulfur acid and a substantial amount of an ammonium salt into a reaction chamber, and heating the resultant waste liquor therein to a temperature of from 800 to 1200° C. for a period of 0.3 to 15 seconds in the presence of from 3–10% by volume of molecular oxygen, based on the gases in the reaction chamber, to obtain an $SO_2$-containing gas essentially free of nitrogen oxides.

2. The process as defined by claim 1 wherein the atomized waste liquor is heated in the presence of liquid sulfur.

3. The process as defined by claim 1 wherein the molecular oxygen is in the form of air.

4. The process as defined by claim 1 wherein the sulfur acid is sulfuric acid.

5. The process as defined by claim 1 wherein said atomized waste liquor is heated for a period of 0.3 to 2.5 seconds in the presence of 3–9% by volume of molecular oxygen, based on the gases in the reaction chamber.

6. The process as defined by claim 1 wherein the atomized waste liquor is heated for a period of from 8 to 10 seconds in the presence of 4–10% by volume of molecular oxygen, based on the gases in the reaction chamber.

7. In a process for the production of a sulfur dioxide-containing gas suitable for use in the manufacture of sulfuric acid, the steps of introducing a finely atomized waste liquor comprising a sulfur acid and a substantial amount of an ammonium salt into a first chamber of a combustion furnace, heating said waste liquor therein to a temperature of from 800 to 1200° C. for a sufficient time and in the presence of a sufficient amount of an oxygen-containing gas such that gases discharging from the chamber contain 4.5 to 5.5% by volume of oxygen, passing said gases discharging from said first chamber into a second chamber of a combustion furnace and introducing therein a sufficient amount of oxygen at a sufficient rate such that gases discharging from the second chamber contain 3 to 9% by volume of oxygen, to obtain an $SO_2$-containing gas essentially free of nitrogen oxides.

8. The process as defined by claim 7 wherein the residence time of the atomized waste liquor in the first chamber is 0.3 to 2.5 seconds.

9. A process as defined by claim 1 wherein the waste liquor comprises 10–50% by weight of inorganic ammonium salts, 10–20% by weight of organic ammonium salts, 10–40% by weight of sulfuric acid, 0–10% by weight of organic impurities, and 20–40% by weight of water.

10. A process as defined by claim 7 wherein the waste liquor comprises 10–50% by weight of inorganic ammonium salts, 10–20% by weight of organic ammonium salts, 10–40% by weight of sulfuric acid, 0–10% by weight of organic impurities, and 20–40% by weight of water.

11. A process as defined by claim 1 wherein the reaction temperature is 1000–1100° C.

12. A process as defined by claim 7 wherein the reaction temperature is 1000–1100° C.

13. A process as defined by claim 9 wherein the reaction temperature is 1000–1100° C.

14. A process as defined by claim 10 wherein the reaction temperature is 1000–1100° C.

References Cited

UNITED STATES PATENTS

| | | | |
|---|---|---|---|
| 1,459,084 | 6/1923 | Bezanson | 23—177 |
| 2,038,429 | 4/1936 | Hechenbleikner | 23—173 |
| 2,301,650 | 11/1942 | Titlestad | 23—177 |
| 2,389,071 | 4/1943 | Merriam | 23—172 |
| 2,406,930 | 9/1946 | Titlestad | 23—172 |
| 2,417,386 | 3/1947 | Titlestad | 23—178 |
| 2,739,039 | 3/1956 | Phelps | 23—129 |
| 2,789,035 | 4/1957 | Hurlburt | 23—177 |

OSCAR R. VERTIZ, *Primary Examiner.*

A. J. GREIF, *Assistant Examiner.*